INVENTORS
DAVID M. CLARK
WALDO J. GUILD
ERNEST E. MARTIN
BY Owen W. Kennedy
ATTORNEY April 23, 1957 D. M. CLARK ET AL 2,789,556
VALVE AND SYSTEM FOR THE PROTECTION OF AIRCRAFT OCCUPANTS
Filed May 11, 1953 4 Sheets-Sheet 2

INVENTORS
DAVID M. CLARK
WALDO J. GUILD
ERNEST E. MARTIN
BY Owen W. Kennedy
ATTORNEY

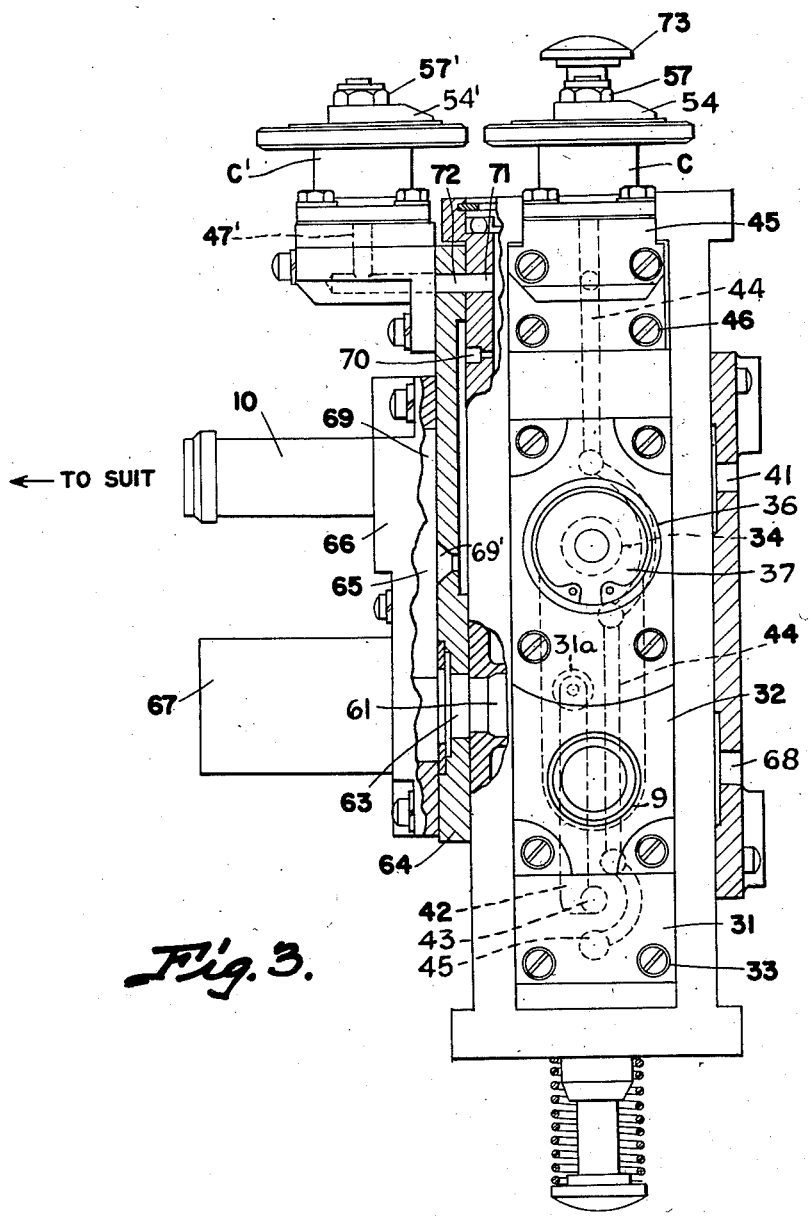

April 23, 1957 D. M. CLARK ET AL 2,789,556
VALVE AND SYSTEM FOR THE PROTECTION OF AIRCRAFT OCCUPANTS
Filed May 11, 1953 4 Sheets-Sheet 4
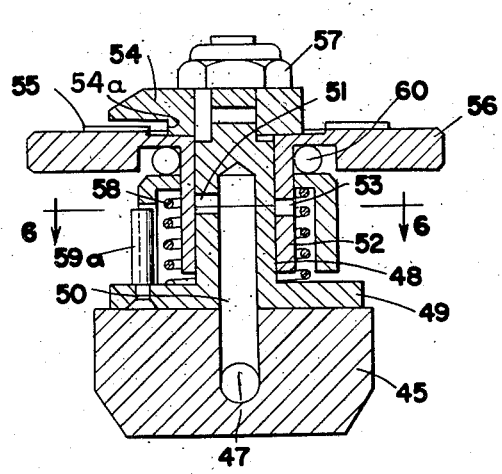
Fig. 5.
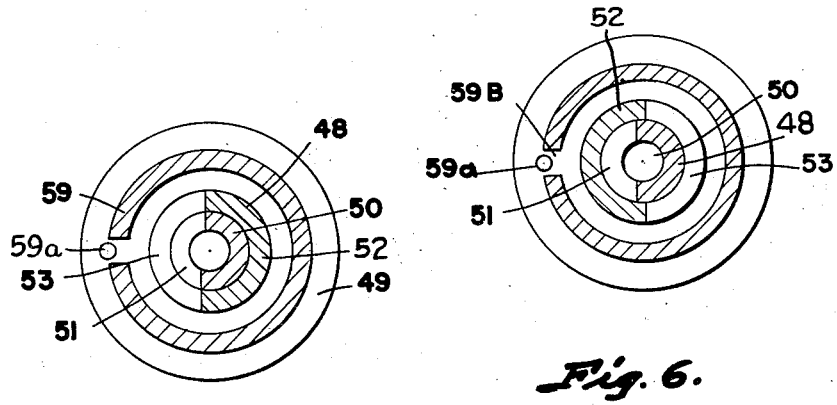
Fig. 7.
Fig. 6.
INVENTORS
DAVID M. CLARK
WALDO J. GUILD
ERNEST E. MARTIN
BY
ATTORNEY United States Patent Office 2,789,556
Patented Apr. 23, 1957

2,789,556

VALVE AND SYSTEM FOR THE PROTECTION OF AIRCRAFT OCCUPANTS

David M. Clark and Waldo J. Guild, Worcester, and Ernest E. Martin, Dayton, Ohio; said Guild and said Martin assignors to said Clark Application May 11, 1953, Serial No. 354,326

14 Claims. (Cl. 128—1)

The present invention relates to a valve and system for the protection of aircraft occupants against the physiological hazards that manifest themselves in the maneuvering of an aircraft at high speed, such manifestations being particularly noticeable when the aircraft is subjected to intense acceleration forces. Such acceleration forces are most commonly set up when an aircraft is turned while traveling at a high rate of speed, as in this maneuver the aircraft and the occupants thereof are subjected to centrifugal forces of such degree as to cause an aircraft occupant to lose vision or consciousness, due to interruption of the normal blood supply to the head and brain.

In Patent No. 2,617,408, issued November 11, 1952, there is disclosed a valve and system for the protection of aircraft occupants which provides means responsive to acceleration forces such as those caused by a change in direction of a fast moving aircraft for creating against critical portions of the body of an occupant of the aircraft sufficient pressure to maintain a normal circulation of blood supply to the head and brain. The system of the aforesaid patent also contemplates the release of these counterpressures upon completion of the turn or other aircraft maneuver which would disturb the blood circulation of the aircraft occupant, and, generally speaking, the valve in the system functions automatically to control not only the application of the counteracting pressures, but also the intensity of such pressures in accordance with the physiological needs of the aircraft's occupant.

In any consideration of the effects of the acceleration forces to which an aircraft occupant is subjected, it is known that the apparent weight of an aviator's body multiplies in ratio to centrifugal force. Thus doubling the weight places the body under a force which is equivalent to two G and may be either positive or negative. That is to say, the forces are compared to the normal pull of gravity on any body, with positive G representing the force which tends to push the body of an aircraft occupant into its seat and draws the blood from the brain into the stomach and lower limbs. On the other hand, negative G can be considered as a force which tends to pull the body of an aircraft occupant away from its seat and to force blood from the stomach and lower limbs into the brain.

Previous valves and systems for the protection of aircraft occupants against the physiological hazards resulting from intense acceleration forces, such as are disclosed in the aforesaid patent have been responsive only to positive G. However, the maneuvers of present-day high speed aircraft have become so complicated as to subject the aircraft occupant to both positive and negative G over a very short time interval within which G may change from a positive to a negative value or vice versa.

An object of the present invention is to provide an improved valve mechanism for incorporation in an inflatable bladder system for the protection of aircraft occupants that will automatically respond to any positive or negative G forces that are set up when an aircraft is turned while traveling at a high rate of speed. Another object is to secure more rapid inflation of the bladders, in the functioning of said valve to apply counteracting pressures to portions of an aircraft occupant's body and for closely controlling the intensity of such pressures.

Another object of the presjent invention is to provide an improved valve mechanism which is extremely compact and light in weight so that very little space is required in the aircraft for the accommodation thereof and very little extra weight is added to the aircraft by the installation of the system.

The above and other advantageous features of the invention will hereinafter more fully appear from the following description, considered in connection with the accompanying drawings, in which, Fig. 1 is a view partially in front elevation and partially in vertical section of a valve mechanism embodying the present invention.

Fig. 3 is a view in side elevation of the valve mechanism of Fig. 1, as viewed from the right, with some parts in section.

Fig. 5 is a fragmentary sectional view, on an enlarged scale, along the line 5—5 of Fig. 2.

Fig. 6 is a horizontal sectional view along the line 6—6 of Fig. 5.

Fig. 7 is a sectional view similar to Fig. 6 showing the parts in different positions.

Figure 4:
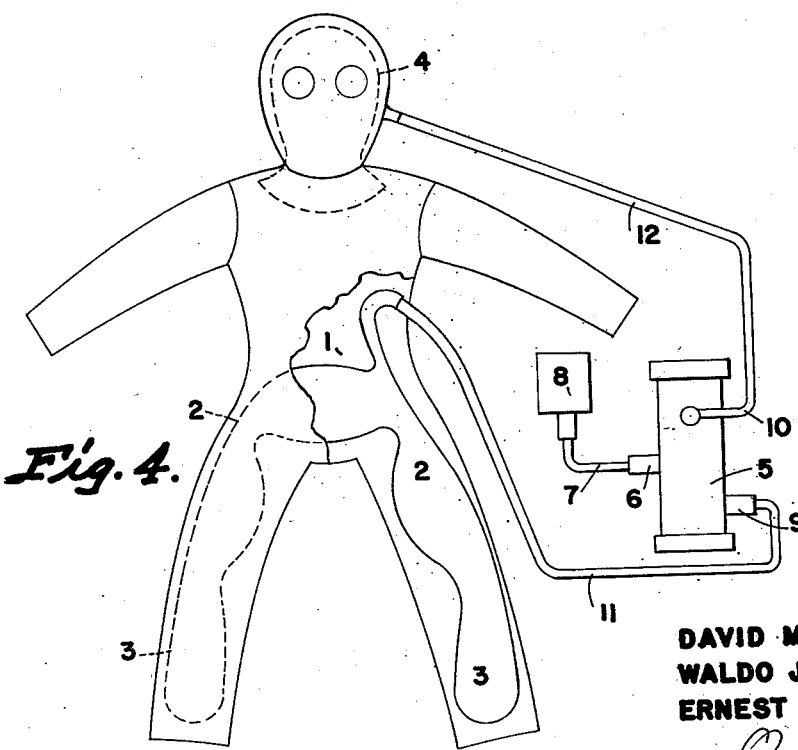
Fig. 4 is a diagrammatic view illustrating the valve mechanism in connection with the elements of a protective system.

Referring first to Fig. 4, there the valve mechanism of the present invention is shown in connection with the elements of a protective system for aircraft occupants which contemplates the use of compressed air, or other fluid pressure medium, for the creation of counteracting pressures against critical portions of the body sufficient to produce the increase in blood pressure necessary to maintain substantially normal circulation and blood supply to the head and brain under all conditions of aircraft flight. As will hereinafter appear, the system provides for the creation of counteracting pressures which not only prevent the blood from flowing towards the lower portions of the body and away from the head and brain, in repsonse to the creation of positive G forces, but also prevent the blood from flowing away from the lower portions of the body and toward the head and brain, in response to the creation of negative G forces.

For this purpose the aircraft occupant wears a set of inflatable bladder-like elements which are held closely against such areas of the body as are adjacent to the main blood supply vessels of the circulatory system. Such elements may be incorporated, if desired, in an assembly worn over or beneath the clothing. A typical arrangement of such bladders is shown in Fig. 4 as consisting of a bladder 1 extending across the wearer's lower abdomen, a pair of bladders 2 extending lengthwise of the upper thighs, and a second pair of bladders 3 extending lengthwise of the calves of the legs. The bladders 1, 2 and 3 may be separate, or connected together as a unit, and are so arranged as to exert, when inflated, effective pressure against body areas closely associated with the main supply vessels of the wearer's blood circulatory system.

In addition to the bladders 1, 2 and 3, the system also comprises an inflatable portion 4 forming part of the suit and indicated in Fig. 4 as comprising part of a helmet. When this portion 4 is inflated it will result in the application of pressure in the vicinity of the head and neck. The bladders 1, 2 and 3 and the inflatable portion 4 thus provide means for exerting counteracting pressures to maintain normal circulation to the head and brain under all conditions of aircraft flight which result in the creation of abnormal positive or negative G forces.

As previously pointed out, the present invention contemplates the provision of a valve mechanism for automatically controlling the inflation and deflation of the bladders 1, 2 and 3 as well as the portion 4, this valve mechanism being indicated generally by the reference character 5 in Fig. 4. The valve provides an inlet connection 6 for receiving a pipe 7 leading from a fluid pressure source 8 and separate outlet connections 9 and 10. The connection 9 receives a pipe 11 leading to the bladders 1, 2 and 3 for the purpose of inflating and deflating these bladders in response to the creation of abnormal positive G forces. The connection 10 receives a pipe 12 leading to the inflatable portion 4, and the functioning of the valve 5 serves to inflate or deflate the portion 4 in response to the creation of abnormal negative G forces.

Figure 1:
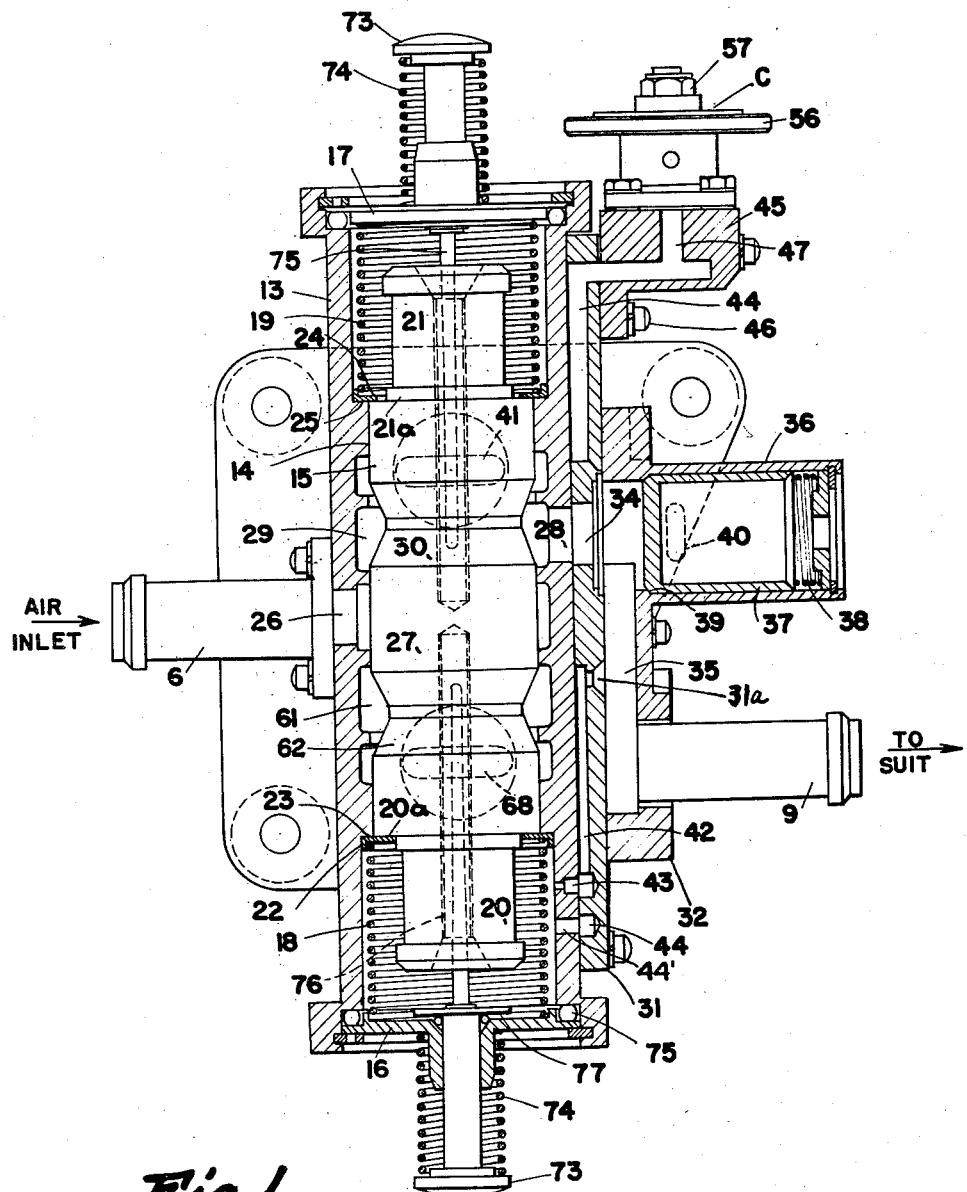

Referring now to Fig. 1, the valve mechanism 5 comprises a casing 13 having a cylindrical bore 14 within which a piston 15 is vertically movable. The piston 15 is normally maintained in the position of Fig. 1 with its ends equally spaced from end plates 16 and 17 of the casing 13 by means of coil springs 18 and 19 surrounding reduced end portions 20 and 21 of the piston 15.

The spring 18 extends between the lower end plate 16 and a pressure ring 22 which bears on a shoulder 23 provided by the casing 13, and also freely surrounds a shoulder 20a between the reduced portion 20 and the body of the piston. The spring 19 extends downwardly between the end plates 17 and a pressure ring 24 bearing on a shoulder 25 provided by the casing 13 and freely surrounding a shoulder 21a between the reduced portion 21 and the body of the piston 15. Therefore, the springs 18 and 19 tend to yieldingly maintain the piston 15 in a balanced position where it is symmetrically disposed with reference to the cylindrical bore 14 and the end plates 16 and 17 of the casing 13. This position can best be described as the neutral position of the valve when the aircraft is in level flight, it being noted that, should positive G forces move the piston downward, the spring 18 is compressed, while the spring 19 is restrained from following the downward motion of the piston by the casing shoulder 25. With upward motion of the piston under negative G force, the spring 19 resists the motion while the spring 18 is held inoperative by the casing shoulder 23. These springs also prevent the operation of the valve under small values of G force, either positive or negative, from which the aircraft occupant needs no protection.

The casing 13 provides a port 26 in communication with the inlet connection 6, so that pressure medium from the source 8 is always available at the port 26. Normally the port 26 is shut off from the remainder of the casing bore 14 by a centrally located cylindrical portion 27 of the piston 15. The casing 13 also provides a port 28 opposite to and above the port 26, with this port in communication with an annular space 29 within the bore 14 surrounding a reduced neck 30 provided by the piston 15.

The side of the casing 13 carrying the port 28 provides two superimposed porting plates 31 and 32 connected to the casing 13 by means of screws 33, as best shown in Fig. 3. The inner plate 31 provides an opening 34 in communication with the port 28 and this opening 34 is in communication with a passage 35 leading downwardly along the outer plate 32 to the bladder outlet connection 9 which is carried by the plate 32.

The plate 32 also provides a hollow cylinder 36 within which a piston 37 is movable, the piston being yieldingly maintained in the position of Fig. 1 by a spring 38. In this position the piston 37 engages a shoulder 39 at the inner end of the cylinder, with the piston 37 covering a port 40 in the side of the cylinder, as shown in dotted lines in Fig. 1. Port 40 communicates directly with the atmosphere. The purpose of the cylinder 36 and the piston 37 is to serve as an emergency relief valve should the pressure at the port 28 exceed a predetermined value beyond the permissible pressure for the bladder system.

With the piston 15 occupying the neutral position of Fig. 1, the space 29 surrounding the neck 30 of the piston is in communication with a port 41 provided in the wall of the casing 13 and opening to the atmosphere. Therefore, as long as the piston 15 remains in this position, the bladders 1, 2 and 3 that are in communication with the connection 9 through the pipe 11 are in a deflated condition due to the fact that the port 41 is in communication with the bladders. However, should the maneuvers of the aircraft result in the creation of abnormal positive G forces, the piston 15 will tend to move downwardly from the position of Fig. 1 against the force of the spring 18, with the extent of this downward movement being limited only by contact with the bottom end plate 16. When such movement occurs, the cylindrical portion of the piston above the neck 30 closes exhaust port 41 from space 29, while the neck portion 30 places port 26 in communication with space 29 and, hence, suit port 28. The pressure medium is thus admitted through the passage 35 in the plate 32 to the suit bladders for inflation to exert a counter-acting pressure on portions of the wearer's body and thereby prevent the flow of blood from the head and brain that would otherwise result from the creation of abnormal positive G forces. The pressure to which the bladders are inflated will depend upon the magnitude of the G force and upon the setting of an adjustable control device C which is mounted at the top of the valve casing 13 and is later described in detail, but which will now be considered as set at its "0" or inoperative position.

The duration of the period through which the bladders are inflated depends upon the existence of acceleration forces and the length of time such forces are effective to create a positive G effect. Furthermore, the valve mechanism is so arranged so as to modify the effect of the acceleration forces thereon to vary the intensity of the pressure exerted by the bladders in a definite relation to the magnitude of the acceleration forces. For this purpose, the plate 31 provides a passage 42 in communication with the passage 35 of the plate 32 through hole 31a, with this passage 42 connecting at its lower end with an opening 43 extending through the wall of the casing 13 into the space at the lower end of the casing surrounding the reduced portion 20 of the piston 15. This passage 42 is shown in dotted lines in Fig. 3 as being slightly offset to the left from the central axis of the piston 15, with the section of Fig. 1 being taken along the passage 42.

The admission of pressure medium to the passage 35 for inflating the bladders 1, 2 and 3 will therefore have the effect of admitting the pressure medium to the lower end of the casing 13 where it will be effective to exert an upward force on the piston 15 in opposition to the downward force exerted thereon when subjected to positive G forces created by acceleration of the aircraft. Since the passage 42 leading to the opening 43 at the lower end of the casing is in communication with the inlet port 26 as soon as the piston 15 starts to move downwardly, the pressure medium is available to create an upward pressure against the piston. When sufficient force is built up by this pressure, acting upward upon the area of the piston, combined with the force of the spring 18, to overcome the existing downward G force, the piston is raised to cut off the supply of pressure medium to the bladders, from port 26 to port 28. Slight oscillation of the piston, upward and downward to connect the bladders to exhaust or to more pressure respectively, brings about a state of equilibrium between the opposing forces acting upon the piston, with both the pressure and exhaust connections to the bladders closed and with equal, now static, pressures in the bladders and in the space below the piston.

An increase of G force will overcome the opposing force beneath the piston, forcing the piston downward to supply more pressure medium to the bladders and to the space beneath the piston, until equilibrium is again established, with a correspondingly higher bladder pressure. Similarly, with a decrease in G force, the piston rises to open the suit port 28 to the exhaust port 41 and thereby reduces the bladder pressure and that beneath the piston to reestablish equilibrium between the opposing forces.

Since the force of the spring 18, which is a constant value at the equilibrium position of the piston, is a constant addition to the force of the bladder pressure imposed upon the bottom of the piston, the relation of bladder pressure to G force cannot be expressed as a direct ratio. This constant force of the spring determines the minimum incremental value of G at which the valve will operate. As indicated above, the springs exert a sufficient force to prevent operation of the valve under small incremental values of G force, from which the aircraft occupant needs no protection. As soon as the minimum incremental value of G is exceeded, the piston will move until a balance is achieved between this G force and the fluid pressure exerted in opposition thereto. For each additional increment of G force, there must be an increase in fluid pressure to maintain the piston at the proper position of balance, such that a definite relationship exists between the incremental values of fluid pressure and the increments of G. This is commonly referred to as pounds per square inch per G, or p. s. i. per G. Each increment of G develops a given increment of p. s. i. in the bladders. With the adjustable control device C in its inoperative setting, the p. s. i. per G of the valve depends upon the effective pressure receiving area of the piston in relation to the weight of the moving parts, in this case, the weight of the piston 15, and pressure ring 22, plus one half the weight of the spring 18.

With the cessation of G forces, as normal level flight is resumed, the spring 18 returns the piston to its neutral position as shown in Fig. 1 with the bladders connected to the exhaust port 41.

With a rapid development of G forces, as by a sharp bank of the aircraft into a turn, a corresponding rapid inflation of the bladders is important to adequately protect the aircraft occupant against a temporary diminution of his faculties, commonly termed a "gray-out." In this respect the valve here disclosed is an improvement over that disclosed in the previously mentioned Patent No. 2,617,408. In this previous patent disclosure, the space in the lower end of the casing is supplied with pressure medium from the piston neck through radial and longitudinal passages within the piston, in close proximity to the pressure source and therefore kinetically at a pressure near the upper end of the pressure gradient in the flow from the source to the bladders. Pressure is therefore built up much faster in the space below the piston than is built up within the bladders, the piston is raised against the opposing G force prematurely to a point where sufficient added resistance to flow is introduced between input and the piston neck to reduce the pressure applied against the bottom of the piston to equilibrium with the existing G force. This added restriction reduces the flow to the bladders with a corresponding lag in the inflation of the bladders.

In the present disclosure, the space below the piston is supplied with the pressure medium from the passage 35, in close proximity to the port 9 to which the bladder system is connected. Kinetic pressure within the passage 35 is therefore close to the low end of the pressure gradient existing in the rapid flow of the medium from the source 8 to the bladders during the initial inflation of the bladders. The rise in pressure imposed upward upon the piston will therefore follow more closely in value the rise in pressure built up in the bladders, resulting in a later raising of the piston against the opposing G force than in the disclosure of said patent.

To further enhance rapid initial inflation of the bladders, hole 31a which connects passages 35 and 42 is in the form of a conical depression as can be seen from Fig. 1. Rapid flow of pressure medium through passage 35 across this depression, tends to reduce the transfer of pressure to passage 42, and to further equalize the rise in pressure in the space below the piston with that in the bladders.

In the maneuvering of an aircraft at high speeds, there are times when the pilot wishes to have the bladder system inflated at a higher pressure per unit of acceleration force, as expressed in terms of positive or negative G forces, than would result from a selection of weight and piston area to give normal protection to the aircraft occupant. For example, whenever a pilot executes a one hundred and eighty degree turn more time is required for its completion than would be required for a turn of lesser degree assuming the same rate of speed in both cases. Therefore, the greater the turn the longer will be the duration of the period in which the pilot is subjected to acceleration forces, and it is desirable to have the bladder system inflated at a higher pressure whenever the turn is of longer duration. In the aforesaid Patent No. 2,617,408, the valve mechanism is capable of increasing the bladder system pressure by utilizing additional weight for the valve piston. The present invention contemplates accomplishing the same and additional results more effectively by utilizing the control device C to adjustably raise the pressure increment per G within the bladders to a higher value than that required beneath the piston to establish equilibrium with the G force.

For this purpose, opening 43 is in the form of a small orifice so as to meter the flow of pressure medium from the passage 35 to the space below the piston 15. A second opening 44' in the casing wall is connected to the control device C by a passage 44 in plate 31. This passage 44 is shown in dotted lines in Fig. 3 as extending upwardly through the plate 31, with the passage curving outwardly around the opening 34 and terminating at a point opposite to the base 45 of the control device C that is attached to the plate 31 by screws 46. The base 45 provides a right-angled passage 47 which leads upwardly to the control device C which, as a unit, constitutes an adjustable metering orifice interposed between the space below the piston 15 in casing 13 and the atmosphere. With this orifice closed, the pressure below the piston becomes static and equal to the bladder pressure whenever equilibrium is established with the existing G force as previously described. However, when the orifice within the control device C is opened, a flow of pressure medium is set up from the passage 35 through the orifice 43 to the space below the piston, and to atmosphere through the orifice of the control device, with the kinetic pressure gradient in this flow governed by the orifice 43 and the adjustable orifice of the control device C, at either side of the chamber below the piston.

For an example, let us assume that a stable G force exists which requires that 1 p. s. i. must be built up in the space below the piston in order to establish equilibrium of forces. This value of 1 p. s. i. must also exist across the orifice of the control valve regardless of the setting of this control valve. Assuming, for the purpose of illustration, that the orifice of the control valve has been adjusted so as to have the same resistance to flow as orifice 43, then the pressure drop across orifice 43 will be 1 p. s. i. also. The total pressure drop across both orifices in series will be 2 p. s. i., which will then be the pressure in the bladders.

Any adjustment of the area of the orifice in the control device, does not change the pressure drop at this point as this remains at 1 p. s. i. to maintain equilibrium at the assumed G force. However, the rate of flow through this orifice and through the orifice at 43 is reduced as the control orifice is reduced in area and the pressure drop required at the orifice at 43 to maintain this reduced flow is also reduced, and the p. s. i. per G of the bladders is reduced. Adjustment of the orifice in the control device to a larger area likewise increases the p. s. i. per G.

The construction of the control device C will next be described with reference to Figs. 5 and 6. The device consists of a central stud 48 having a flange 49 secured to the base 45, with a passage 50 in register with the base passage 47. A slot 51 extends through the wall of the passage 50 so that pressure medium supplied to the control device through the passage 44 can be discharged into the atmosphere to a variable extent as determined by the setting of the device.

For this purpose, the control device provides a sleeve 52 that is turnable on the stud 48, with the side of the sleeve providing a slot 53 that cooperates with the slot 51 on the stud 48. As best shown in Fig. 6, the slots 51 and 53 extend around the stud 48 and sleeve 52 respectively, so that the slot 53 registers with the slot 51 in varying angular degree as the sleeve 52 is turned on the stud. In the position of Fig. 6, the slot 53 is entirely out of register with the slot 51, so that pressure medium cannot escape from the passage 50. However, by turning the sleeve 52, the degree to which the slot 53 registers with the slot 51 can be varied within a wide range wherein the slot 51 is fully closed or fully open, as shown in Fig. 7.

In order to indicate the relation between the slots 51 and 53, the upper end of the stud 48 provides a pointer 54 cooperating with a series of markings 55 on the upper face of a disc 56 forming part of the sleeve 52. When the disc 56 is in the position where the pointer 54 coincides with the zero mark, the sleeve 52 is in a position where the slots 51 and 53 are out of register and there is no escape of the pressure medium from the control device. However, by turning the disc 56 in a clockwise direction, the pointer 54 will successively register with the other markings 55 to indicate the opening of the ports 51 and 53 with a gradually increasing area of the control device orifice, which as previously described, increases the p. s. i. per G of the bladder system.

The width of the air escape orifice represented by the overlapping slots 51 and 53 can be controlled by adjusting the sleeve 52 axially with respect to the stud 48. For this purpose the upper end of the stud 48 is threaded to receive a self-locking nut 57 which engages the upper surface of the pointer 54 and urges the latter into engagement with the disc 56 which forms part of the sleeve 52. The pointer 54 is slidably keyed to the stud 48 and provides a shoulder 54a which engages the center of the disc and maintains the underside of the pointer away from the disc markings 55 with a slight clearance.

The sleeve 52 is yieldingly maintained in frictional engagement with the stationary pointer 54 by a spring 58 which extends between the flange 49 and the upper inner end of an inverted cup 59 surrounding the spring and spaced at its lower end from the flange 49. The upper outer end of the cup 59 bears against a ring 60 fitting loosely within a groove in the underside of the disc 56. The cup 59 is prevented from turning with the disc 56 by a pin 59a on flange 49, which is received in a slot 59b of said cup. The sleeve 52 is therefore shiftable along the stud 48 by turning the nut 57 against the pressure of the spring, so as to determine the extent to which the slots 51 and 53 register axially with each other. The slots are shown in partial axial registry in Fig. 5, and, obviously, the width of the air escape orifice can be varied by turning the nut 57 to increase or decrease the extent of registration of the slots as measured axially of the stud.

The control device C therefore provides a variably adjustable leak to atmosphere which, in cooperation with the fixed orifice 43 at the lower end of casing 13, controls the p. s. i. per G to which the bladders are inflated.

With any given setting of the nut 57 to obtain a desired slot width, turning of the disc 56 will result in an infinite number of variations of the effective slot length, with the markings 55 being merely illustrative of the pressure range obtainable for inflating the bladder system of the suit between a fully closed, or fully open setting of the control device.

As an illustrative example of this pressure range and its adjustment, let it be assumed that with the slots 51 and 53 entirely closed and no leakage from the valve casing 13, the inflation pressure of the bladder system will be in increments of 0.4 pound per square inch per G. That is to say, this is the pressure required below the piston 15, which, aided by the spring 18, will establish equilibrium with the G forces resulting from acceleration of the aircraft. This is the normal rating of the valve with the control device C having its pointer 54 at the zero setting on the disc 56, wherein the slots 51 and 53 are entirely closed.

Figure 2:
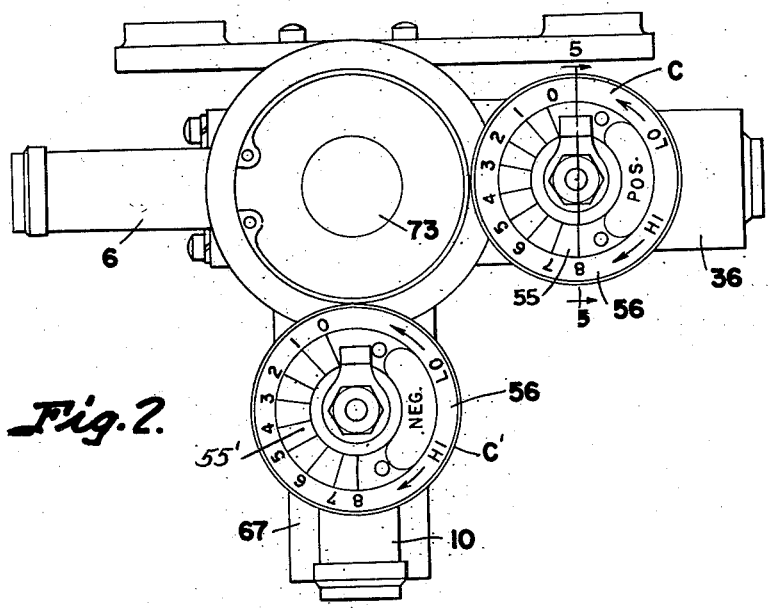
Fig. 2 is a plan view of the valve mechanism of Fig. 1.

However, should it be desired to have the bladder system inflated with an increased pressure increment per G, the disc 56 is turned in a clockwise direction as viewed in Fig. 2, so as to bring one of the other scale markings 55 into register with the pointer 54. This has the effect of increasing the degree of overlapping between the slots 51 and 53 for any given setting of the disc, although the range of marking between zero and eight is entirely relative and does not designate any particular pressure value. Generally speaking, with a pressure increment of 0.4 pound per square inch per G with the slots closed, the turning of the disc 56 through the full range between the zero and eight markings will increase the pressure increment to 2 pounds per square inch per G.

As previously noted, the pressure range is purely illustrative and is determined for a particular valve with a given weight of piston 15 (and associated moving parts) and given effective areas of its pressure-receiving surfaces. The strength of spring 18 determines at what G force the valve begins to function and at what G force the arithmetical progression starts. Obviously, the above figures for pressure increments per G can be varied to suit conditions for different valves and to meet the individual requirements of different pilots. Experience has shown that some pilots desire a higher degree of inflation of the bladder system than others, so that the control device C provides means for a pilot to quickly and conveniently adjust the inflation pressure of the bladder system by merely turning the disc 56 to any desired setting.

As previously pointed out, the valve of the present invention is adapted to respond to the development of negative G forces which will cause upward movement of the piston 15 against the pressure of the spring 19. When this occurs, a space 61 in the casing is placed in communication with the port 26 by upward movement of a neck portion 62 of the piston 15 similar to the neck portion 30. This places the port 26 in communication with an opening 63 in an inner porting plate 64 secured to the side of the casing 13, as shown in Fig. 3. The opening 63 is in communication with a passage 65 in a second outer porting plate 66 which carries the outlet connection 10 leading to the inflatable portion 4 of the suit. Plates 64 and 66 are practically identical in form to plates 31 and 32, respectively, but their position is inverted. The plate 66 also carries a cylinder 67 similar to the cylinder 36 which functions as a relief valve should the source pressure exceed a predetermined permissible value.

With the piston 15 occupying the neutral position of Fig. 1, the space 61 surrounding the neck portion 30 is in communication with a port 68 which opens to the atmosphere so that the inflatable portion 4 is in a deflated condition. However, upward movement of the piston 15 in response to the creation of negative G forces will cause the piston to close the port 68 before the port 26 is in communication with the space 61 so that the portion 4 will be inflated to exert a counteracting pressure to prevent an abnormal flow of blood to the head and brain. While for purposes of illustration the inflatable portion 4 is shown as forming part of the helmet of the suit, obviously the portion 4 can be of any desired form necessary to exert pressure on portions of the wearer's body located above the waist.

In order to admit pressure medium to the upper end of the casing 13 which surounds the piston portion 21, the plate 64 provides a passage 69 in communication with the passage 65 through a tapered orifice 69', and connecting to the space above the piston 15 through an opening 70 in the wall of the casing 13. In order to adjustably control the inflation pressure of the portion 4, a control device C' is mounted on the plate 64, which control device is identical with the control device C and therefore need not be described in detail. The passage 47' in the base 45' of the control device C' is in direct communication with the upper end of the casing 13 through aligned openings 71 and 72 in the casing 13 and plate 64, respectively. Therefore, the control device C' is adapted to adjustably regulate the pressure to which the suit portion 4 is inflated to counteract the effect of negative G forces, in the same manner as previously described with reference to the control device C. Generally speaking, it is desirable that the pressure increment per G for the inflation of portion 4, as determined by the setting of the control device C' be lower than the pressure increment for the bladder system acting on the lower portion of the body as determined by setting of the control device C.

In order that the pilot may test the operativeness of the valve 5 at any time, each end of the casing 13 provides a knob 73 slidable within an end plate 16 or 17 and surrounded by a spring 74 which yieldingly holds the knob in the position of Fig. 1. Each knob 73 provides a rod 75 extending into a central opening 76 in the piston 15, with the end of the rod 75 spaced from the end of the opening. A collar 77 mounted on the rod 75 normally limits the outward movement of the knob 73 by the spring 74 through engagement with either end plate 16 or 17.

Should the pilot desire to test the valve for inflation of the bladder system through connection 9, the upper knob 73 is pushed inwardly until its rod 75 engages the end of opening 76 to move the piston 15 downwardly far enough to obtain the desired inflation of the bladder system to simulate the creation of a positive G effect. By pushing the lower knob 73 inwardly, the piston 15 can be caused to move upwardly far enough to obtain the desired inflation of the suit portion 4 to simulate the creation of a negative G effect. Upon release of either knob 73, the piston 15 will return to its balanced neutral position where it remains in readiness to respond to acceleration forces by movement in either direction to apply counteracting pressures to one or the other of the inflatable elements of the suit, in the manner previously described.

We claim:

1. In a system for preventing an unnatural blood distribution within a human body which is subjected to forces set up when said body is accelerated in space, inflatable elements adapted normally to engage loosely different portions of a human body and adapted when inflated to effect a pressure against the blood-carrying vessels of said body, a source of fluid under pressure for inflating said elements and a control device automatically operative in response to creation of abnormal positive or negative G effects by acceleration forces to cause said pressure source to be connected with one of said elements to inflate the same, the remainder of said elements being disconnected from said pressure source.

2. In a system for preventing an unnatural blood distribution within a human body which is subjected to forces set up when said body is accelerated in space, inflatable elements adapted normally to engage loosely different portions of a human body and adapted when inflated to effect a pressure against the blood-carrying vessels of said body, a source of fluid under pressure for inflating said elements and a control device automatically operative in response to creation of abnormal positive or negative G effects by acceleration forces to cause said pressure source to be connected with one of said elements to inflate the same, while the rest of said elements remain in a deflated condition, said control device being operative upon the diminution of said acceleration forces to disconnect the inflated element from said pressure source.

3. In a system for preventing an unnatural blood distribution within a human body which is subjected to forces set up when said body is accelerated in space, inflatable elements adapted normally to engage loosely different portions of a human body and adapted when inflated to effect a pressure against the blood-carrying vessels of said body, a source of fluid under pressure for inflating said elements and a control device automatically operative in response to creation of abnormal positive or negative G effects by acceleration forces to cause said pressure source to be connected with one of said elements to inflate the same, while the rest of said elements remain in a deflated condition, said control device being maintained in one condition in response to acceleration which creates a positive G effect and being maintained in another condition in response to acceleration which creates a negative G effect.

4. In a system for preventing an unnatural blood distribution within a human body which is subjected to forces set up when said body is accelerated in space, inflatable elements adapted normally to engage loosely different portions of a human body and adapted when inflated to effect a pressure against the blood-carrying vessels of said body, a source of fluid under pressure for inflating said elements and a control device automatically operative in response to acceleration forces to cause said pressure source to be connected with one of said elements to inflate the same, while the rest of said elements remain in a deflated condition, said control device normally occupying a balanced position in which both of said inflatable elements are disconnected from said pressure source, and being movable from this position in opposite directions in response to the creation of either positive or negative G effects to connect one or the other of said elements to said pressure source.

5. In a system for preventing an unnatural blood distribution within a human body which is subjected to forces set up when said body is accelerated in space, a pair of inflatable elements adapted normally to engage loosely different portions of a human body and adapted when inflated to effect a pressure against the blood-carrying vessels of said body, a source of fluid under pressure for inflating said elements and a control device automatically operative in response to creation of abnormal positive or negative G effects by acceleration forces to cause said pressure source to be connected with one of said elements to inflate the same while the other of said elements remains in a deflated condition, said control device comprising a cylindrical casing, a piston movable within said casing, springs for normally maintaining said piston in a balanced position and passages to said inflatable elements controlled by relative movement between said casing and piston in response to acceleration forces, whereby said pressure source is connected to one inflatable element upon creation of a positive G effect, while the pressure source is connected to the other inflatable element upon the creation of a negative G effect.

6. In a system for preventing an unnatural blood distribution within a human body which is subjected to forces set up when said body is accelerated in space, an inflatable element adapted normally to engage loosely a portion of the human body and adapted when actuated, to effect a pressure against the blood-carrying vessels of said body, a source of air under pressure for inflating said element, a control device automatically operative in response to acceleration forces to cause said source of air to be connected with said element to inflate the same and automatically operative upon the diminution of said acceleration forces to disconnect said element from said source of air, means for directing a portion of the air from said source through said control device so as to modify the effect of the acceleration forces thereon, thereby to vary the intensity of the pressure exerted upon said element in accordance with the magnitude of the acceleration forces, means for venting said portion of the air to the atmosphere, and means for varying the size of said venting means so as to vary the modifying effect of this air on the control device.

7. In a valve mechanism which is adapted to be subjected to acceleration forces, a casing adapted to be connected to a source of air under pressure and to an inflatable body engaging element, a control member mounted for movement within said casing in one direction in response to acceleration forces thereby to connect said pressure source with said inflatable element, means automatically effective to move said control member in the opposite direction upon the cessation of said acceleration forces thereby to disconnect said pressure source from said inflatable element, means within said casing for directing a portion of said air against said control member so as to bias the same in said opposite direction and vary the pressure of the air supplied to said inflatable element in accordance with the intensity of said acceleration forces, an atmospheric vent for diverting said portion of the air away from said control member to increase the pressure of the air supplied to said inflatable element, and means for varying the size of said vent.

8. In a valve mechanism which is adapted to be subjected to acceleration forces, a casing adapted to be connected to a source of air under pressure and to an inflatable body engaging element, a control member mounted for movement within said casing in one direction in response to acceleration forces thereby to connect said pressure source with said inflatable element, means automatically effective to move said control member in the opposite direction upon the cessation of said acceleration forces thereby to disconnect said pressure source from said inflatable element, means within said casing for directing a portion of said air against said control member so as to bias the same in said opposite direction and vary the pressure of the air supplied to said inflatable element in accordance with the intensity of said acceleration forces, and manually adjustable means for diverting said portion of the air away from said control member so as to vary the pressure of the air supplied to said inflatable element in accordance with the amount of air which is diverted.

9. In a valve mechanism which is responsive to changes in acceleration, a casing, a fluid-pressure inlet port in said casing connected to a source of fluid pressure, an outlet port in said casing connected to an inflatable body engaging element, a control member mounted for movement within said casing in one direction in response to acceleration forces thereby to connect said inlet port to said outlet port, means automatically effective to move said control member in the opposite direction upon the cessation of said acceleration forces thereby to disconnect said outlet port from said inlet port, means for directing a portion of the fluid supplied to said inflatable element from said outlet port against said control member so as to urge said control member in said opposite direction and to vary the pressure of the fluid supplied to said inflatable element in accordance with the intensity of said acceleration forces, and a manually adjustable means for venting said portion of fluid from said control member to the atmosphere so as to vary the fluid pressure in said inflatable element in accordance with the amount of fluid so-vented.

10. In a valve mechanism which is responsive to abnormal changes in acceleration, a casing having a substantially cylindrical cavity, a fluid-pressure inlet port in said casing connecting said cavity to an external source of fluid pressure, an outlet port in said casing connecting said cavity to an inflatable body-engaging element, a piston mounted in said cavity and normally blocking communication between said ports, said piston being adapted by its movement towards one end of said cavity under the influence of acceleration forces to place said inlet port in communication with said outlet port through said cavity, means for moving said piston away from said one end of said cavity upon the cessation of said acceleration forces thereby to disconnect said ports from one another, a space at said one end of said cavity beyond the path of movement of said piston, a passageway connecting said outlet port to said space, and means for effecting communication between said space and the atmosphere.

11. The valve mechanism according to claim 10 wherein said means for effecting communication between said space and the atmosphere is a variable orifice.

12. In a valve mechanism which is responsive to abnormal changes in acceleration forces, a casing having a substantially cylindrical cavity, a fluid-pressure inlet port in said casing connecting said cavity to an external source of fluid pressure, a first outlet port in said casing connecting said cavity to a first inflatable body-engaging element, a second outlet port in said casing connecting said cavity to a second inflatable body-engaging element, a piston centrally mounted in said cavity and spaced from the ends of said cavity so as to define a first chamber at one end of said cavity and a second chamber at the other end of said cavity, and means mounted in each chamber for resiliently urging said piston towards the center of said cavity, said piston being adapted by its movement towards said other end of said cavity under the influence of a given acceleration change to place said inlet port in communication with said first outlet port and being adapted by its movement towards said one end of said cavity under the influence of an opposite acceleration change to place said inlet port in communication with said second outlet port.

13. The valve mechanism according to claim 12 including a first conduit connecting said first outlet port to said second chamber and a second conduit connecting said second outlet port to said first chamber.

14. The valve mechanism according to claim 13 including an atmospheric vent connected to each chamber, each vent having an adjustable opening.

References Cited in the file of this patent

UNITED STATES PATENTS

| | | |
|---|---|---|
| 2,617,408 | Clark et al. | Nov. 11, 1952 |
| 2,622,609 | Moller | Dec. 23, 1952 |

FOREIGN PATENTS

| | | |
|---|---|---|
| 604,304 | Great Britain | July 1, 1948 |